United States Patent Office 3,529,023
Patented Sept. 15, 1970

3,529,023
α-HYDROXYMETHYLALKYLIDINE AMINES
Richard Leshin, Akron, Ohio, assignor to The Goodyear Tire & Rubber Company, Akron, Ohio, a corporation of Ohio
No Drawing. Continuation-in-part of application Ser. No. 443,168, Mar. 26, 1965. This application July 29, 1968, Ser. No. 748,219
Int. Cl. C07c 119/00
U.S. Cl. 260—566       2 Claims

ABSTRACT OF THE DISCLOSURE

Compositions resulting from the reaction of an alpha (hydroxymethyl) substituted aldehyde resulting from the reaction of a higher aldehyde containing at least one replaceable hydrogen with at least one mole equivalent of formaldehyde and not more moles than the number of replaceable alpha hydrogens per mole of the higher aldehyde and a primary amine including alkyl, cycloalkyl, and aralkyl amines and particularly the Schiff bases and to the reaction product of pentaerythrose and certain amines including cyclohexyl amine; ter-butyl amine; ter, teroctyl amine; and to a process for making these compositions. These Schiff base compositions are useful as methylene donors in forming a resin in situ in rubber, used to reinforce the rubber.

This is a continuation-in-part application of application Ser. No. 443,168 filed Mar. 26, 1965, now Patent No. 3,411,980.

This invention relates to new and improved compositions useful as methylene donors in forming a resin in-situ in rubber.

It is well know to use rubber in the manufacture of pressure hose, drive belts, and pneumatic tires, but when used in this manner it is necessary to reinforce the rubber with a textile material such as cotton, rayon, nylon, etc.

With the advent of polyester and polycarbonate fibers, it was necessary to develop a better adhesive system between these fibers and rubber and attempts were made by adding resin forming reactants to the rubber which would react to form a resin in-situ. However, it was soon observed that just any resin may not be used but only those resin in-situ systems that do not destroy the desirable physical properties of the vulcanized rubber and of the reinforcing fiber especially after the rubber and the fiber have been subjected to aging.

One class of methylene donors, that may be used in forming the in-situ resin in the rubber, are made by reacting a higher aldehyde containing at least one replaceable alpha hydrogen with at least one mole equivalent of formaldehyde and not more moles than the number of replaceable alpha hydrogens per mole of the higher aldehyde. The higher aldehydes may be represented by the structural formula RR'CHCHO wherein R and R' may be hydrogen or lower alkyl (1–8C), phenyl, naphthyl and other aryl radicals. The resulting methylol compounds are referred to as alpha (hydroxymethyl) aldehydes having the characteristic linkage

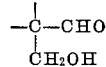

and which form resins in-situ with methylene acceptors.

The alpha (hydroxymethyl) aldehydes in turn may be reacted with a hydrocarbon (3–20C) primary amine (R″NH$_2$) to from an N-[alpha (hydroxymethyl) substituted alkylidene]-N-(hydrocarbon substituted amine. These amines are also known as Schiff bases having the characteristic linkage

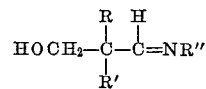

The aldehydes and the amines useful in this invention may be represented by what is believed to be the general structural formula having the following grouping of atoms:

wherein Y is oxygen or NR″, R and R′ being hydrogen or methylol, or lower alkyl (1–8C), phenyl or naphthyl and R″ being a hydrocarbon radical such as alkyl (3–20C), cycloalkyl (3–20C) or aralkyl (3–20C) wherein the carbon of the hydrocarbon radical attached to the nitrogen is also attached to at least two other carbons. An example of an aldehyde believed to correspond to the general formula:

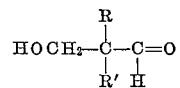

is trimethylol acetaldehyde (also known as tris (hydroxymethyl) acetaldehyde, also pentaerythrose). Other examples include dimethylol acetaldehyde, 3-hydroxy propionaldehyde, 2,2-dimethylolpropionaldehyde, and 2-ethyl-2-methylol butyraldehyde. Examples of Schiff bases believed to have the general formula

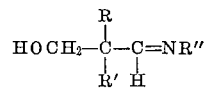

include

N-[2,2,2-tri (hydroxymethyl) ethylidene] cyclohexylamine,
N-[2,2,2-tri (hydroxymethyl) ethylidene] ter, teroctylamine,
N-[2,2,2-tri (hydroxymethyl) ethylidene] ter-butylamine,
N-[2,2,2-tri (hydroxymethyl) ethylidene] isopropylamine,
N-[2,2,2,-tri (hydroxymethyl) ethylidene] 2-aminopentane,
N-[2,2,2-tri (hydroxymethyl) ethylidene] 2-aminohexane,
N,N′-bis [2,2,2-tri (hydroxymethyl) ethylidene] p-methanediamine.

The alpha (hydroxymethyl) aldehydes may be prepared by reacting the desired aldehyde with formaldehyde. Pentaerythrose is prepared by reacting 3 moles of formaldehyde with one mole of acetaldehyde. One mole of formaldehyde reacted with one mole of isobutyraldehyde produces 2-(hydroxymethyl) isobutyraldehyde. Schiff bases may be prepared as noted above by refluxing a benzene solution of the desired amine with the desired aldehyde and removing the resulting water of reaction. The benzene may then be removed by distillation under vacuum, leaving the desired product as a nondistillable residue. The following example is exemplary of a new method of making an N-[alpha (hydroxymethyl) substituted alkylidene] amine.

EXAMPLE 1

The specific N-[alpha (hydroxymethyl) substituted alkylidene] -N-hydrocarbon substituted) amine, N-[2,2,2-tri (hydroxymethyl) ethylidene] ter-butylamine, is formed by refluxing 1 mole (134 parts) of pentaerythrose with 1.2 moles (87½ parts) of ter-butylamine in 400 parts of benzene for one hour with stirring. The water is removed azeotropically and remaining benzene removed under vacuum. The product remained as a partly yellow resin in an amount of 162 parts corresponding to 85.8% of theory.

Wherever the term lower alkyl radical (1–8C) is used is meant methyl, ethyl, propyl (n- and iso-), butyl (n-, sec-, iso-, and tert-) amyl (n-, sec-, iso-, and tert-), hexyl e.g. n-hexyl, sec-hexyl, 2,2-dimethyl-3-butyl, 2,2-dimethyl-4-butyl, 2,3-dimethyl-2-butyl, 2-methylphenyl, 2-methyl-2-pentyl, 3-methyl-1-pentyl, 3-methyl-2-pentyl, etc., heptyl, e.g. n-heptyl, sec-heptyl, 2,3-dimethyl-3-pentyl, 2,4-dimethyl-2-pentyl, 2,4-dimethyl-3-pentyl, 2,2,3-trimethyl-3-butyl, 3-ethyl-2-pentyl, 2-methyl-hexyl, etc., octyl, e.g. n-octyl, 2-ethyl-hexyl, and diisobutyl. Other radicals include cycloaliphatic radicals; for example, cycloalkyl radicals, e.g. cyclopentyl, alkylatedcyclopentyl, e.g. mono- and polymethylcyclopentyl, cyclohexyl, and alkylated cyclohexyl, e.g. mono- and polymethylcyclohexyl, mono and polyethylcyclohexyl, mono- and polyisopropylcyclohexyl, mono- and polytertamylcyclohexyl, n-octylcyclohexyl, diisobutlcyclohexyl, ter, ter-octylcyclohexyl, nonylcyclohexyl, diisoamylcyclohexyl, dodecylcyclohexyl, and hexadecylcyclohexyl. By aryl and aralkyl radicals is meant benzyl, methylbenzyl, diisobutylbenzyl, phenylethyl, phenylpropyl, phenyloctodecyl, naphthylmethyl, ter-amylnaphthylmethyl and naphthyl-ethyl.

A most important property exhibited by the methylene donors of this invention after they have reacted with a methylene acceptor to form the resin in-situ is the fact that the resulting products of the reaction do not degrade a polyester or a polycarbonate cord, particularly when the cord is embedded in the rubber and the laminate then subjected to high temperatures for prolonged periods of time particularly under those conditions that prevail when the laminate is used in the construction of a pneumatic tire which runs at high speeds and which in turn tends to generate large amounts of heat.

N-[alpha (hydroxymethyl) substituted alkylidene]-N-(hydrocarbon substituted) amines may also be prepared by reacting an alkylidene amine prepared in accordance with the method of Hurwitz U.S. Pat. No. 2,582,128 with mole equivalents of formaldehyde equal to and not more moles than the number of replaceable alpha hydrogens. Specifically one mole of N-(ethylidene) ter-butylamine was slowly added to 3 moles of 37% aqueous formaldehyde at 10° C. and the mixture allowed to warm to 25° C. The yellow resinous produce was dried under vacuum. This product produced the same results when used as a methylene donor as did the product of Example 1.

The following example illustrates the best mode in which the invention may be performed. All parts are by weight unless otherwise identified.

EXAMPLE 2

| | Parts by weight | |
|---|---|---|
| | Amounts | Range |
| (1) Natural rubber | 65 | 0–100 |
| (2) OE/SBR (styrene/butadiene-1,3 25/75 copolymer) (plus 37½ parts oil per 100 SBR) | 48.13 | 100–0 |
| (3) Carbon black | 40 | 10–60 |
| (4) Zinc oxide | 4 | 2–10 |
| (5) Stearic acid | 2 | 1.5–3.0 |
| (6) Primary accelerator (2,2'-dithiobisbenzothiazole) | 1.25 | .5–3.0 |
| (7) Secondary accelerator (tetramethylthiuram disulfide) | .10 | .05–1.0 |
| (8) Sulfur | 2.5 | 1.0–5.0 |
| (9) Methylene acceptor | As noted | 1–10 |
| (10) Methylene donor (an alpha (hydroxymethyl) substituted acetaldehyde or a Schiff base as described herein) | As noted | 1–10 |

In compounding the rubber stock in accordance with the formulation set forth above, a masterbatch of ingredients 1 and 2 is made with the carbon black in a mill at a temperature of about 110° C. The resulting carbon black masterbatch is then cooled and the remaining compounds are added to the batch in the order indicated above in a Banbury at a temperature of about 70° C. The control rubber was prepared in a similar manner except that a methylene acceptor and a methylene donor were not added. The mole ratio of acceptor to donor may range from 1/1 to 1/6 per 100 parts of rubber and preferably in such ratio, as to use up each resin-forming component in forming the resin in-situ.

The adhesion of the rubber compounds was measured at 250° F. by the hot "U" adhesion test after the cord was coated with the rubber compound under test and the assembly vulcanized for 15 minutes at 310° F. The pounds necessary to pull the adhered cord free from the rubber block is the hot "U" adhesion value. The following table shows the results that may be obtained in the practice of the present invention:

TABLE I

Grey cord as indicated embedded in rubber and vulcanized at 310° F. for 15 minutes for polyester and rayon and vulcanized at 275° F. for 80 minutes for nylon cord.

| Examples | Acceptor | Parts per 100 parts | Donor | Parts per 100 parts | Hot "U" adhesion pounds | | | Cord tensile after 6 hours 300° F. lbs |
|---|---|---|---|---|---|---|---|---|
| | | | | | Nylon | Polyester | Rayon | |
| 3 (control) | None | 0 | None | 0 | 3.2 | 1.6 | 1.8 | 39.2 |
| 4 (control) | Res | 1.10 | HMTA | 2.90 | 12.2 | 8.0 | 19.1 | 11.5 |
| 5 | Res | 1.10 | PERR | 1.80 | 6.0 | 5.3 | 3.9 | 39.0 |
| 6 | Res | 1.10 | THEC | 1.80 | 5.0 | 4.4 | 3.2 | 33.0 |
| 7 | Res | 1.10 | THEB | 1.80 | 6.5 | 7.4 | 5.7 | 33.5 |
| 8 | Res | 1.10 | THEO | 1.80 | 5.1 | 4.7 | 6.0 | 34.5 |
| 9 | Res | 1.10 | THEP | 1.80 | 5.6 | 3.1 | 6.2 | 33.0 |
| 10 | MAP | 1.10 | PERR | 1.80 | 5.0 | 4.8 | 2.3 | 38.0 |
| 11 | MAP | 1.10 | THEB | 1.80 | 6.9 | 4.8 | 5.8 | 34.0 |
| 12 | MAP | 1.10 | THEP | 1.80 | 6.1 | 4.5 | 5.0 | 33.5 |

HMTA—Hexamethylenetetramine. PERR—tris (hydroxymethyl) acetaldehyde. THEC—N-[2,2,2-tri (hydroxymethyl) ethylidene] cyclohexylamine. THEB—N-[2,2,2-tri (hydroxymethyl) ethylidene] ter-butylamine. THEO—N-[2,2,2-tri (hydroxymethyl) ethylidene] ter, ter-octylamine. THEP—N-[2,2,2-tri (hydroxymethyl) ethylidene] isopropylamine. MAP—m-aminophenol. Res—Resorcinol.

In the examples in Table I above, each of the methylene donors will produce an exceptional bond between the surface of the polyester and polycarbonate cords and the rubber, and the values shown are unexpected in view of the fact that no preliminary treatment with an adhesive composition was given to the polyester cord prior to its embedment in the rubber. It has also been observed that the methylene donors react favorably in the rubber to improve the physical properties of the rubber such as the 300% modulus, the ultimate tensile strength, the elongation, the hot rebound, the hot deflection, dynamic modulus, and of equal importance, without degrading the physical properties of the cords being bonded to the rubber and especially after heat aging in the case of the polyester and the polycarbonate cords.

It is believed that the methylene donor undergoes a reversible reaction in the presence of heat to produce methylene either as formaldehyde or as methylene radical, which in turn is nascently reactable with the methylene acceptor to produce a resinous matrix throughout the body of the rubber while at the same time promoting desirable adhesion between the surface of the polyester cord and the rubber. In each instance the hydroxymethyl group on the carbon adjacent (also alpha to) the carbonyl function $$(-\underset{|}{\overset{H}{C}}=O)$$

or adjacent (also alpha to) the imine linkage $$(-\underset{|}{C}=N-)$$

is the essential component which is believed to generate methylene under the heat of vulcanization to form the resinous matrix with the methylene acceptor.

Each of the methylene donors described above will form a resin in-situ in the rubber when reacted with any one or combination of the following methylene acceptors: resorcinol, m-aminophenol, resorcinol monoacetate, resorcinol diacetate and other m-disubstituted benzenes wherein the substituents may be hydroxyl (—OH), amino (—NH$_2$) or acetoxy (—OCOCH$_3$) radicals; as well as 1,5-naphthalenediol, phenol, and alpha and beta naphthol resins resulting from the partial reaction of the foregoing acceptors with formaldehyde. Other acceptors include o-disubstituted benzenes such as o-aminophenol, melamine and the partial reaction products of dicarboxylic acids such as phthalic, isophthalic and terephthalic acids, with phenols such as phenol, resorcinol, o-aminophenol, and m-aminophenol, and partial reaction products with urea, aniline, m-phenylenediamine and p-phenylenediamine.

The rubber compositions containing the combination of methylene acceptors and donors of the type disclosed herein are particularly useful in the manufacture of pneumatic tires, pressure hose, and drive belts, wherein the rubber is subjected to severe forces to the extent that the rubber must be reinforced with a rubber reinforcing agent and the instant invention permits the use of polyester reinforcing agents which possess physical properties far superior to other reinforcing agents, particularly of the rayon and nylon type.

While certain representative embodiments and details have been shown for the purpose of illustrating the invention, it will be apparent to those skilled in this art that various changes and modifications may be made therein without departing from the spirit or scope of the invention.

What is claimed is:
1. A composition having the general formula

$$(HOCH_2)_3C-CH=NR''$$

wherein R'' is selected from the group consisting of cyclohexyl, ter-butyl, ter,ter-octyl, isopropyl, 2-pentyl, and 2-hexyl.

2. N,N'-bis [2,2,2-tri (hydroxymethyl) ethylidene] p-methanediamine.

References Cited

UNITED STATES PATENTS 1,780,149  10/1930  Powers _____ 260—566

OTHER REFERENCES

Franklin, E. C. Nitrogen System of Compounds, New York Reinhold, 1935, p. 252.

Kirk-Othmer Encyclopedia of Chemical Technology, New York Interscience, 1951, p. 864, vol. 6.

LEON ZITVER, Primary Examiner

G. A. SCHWARTZ, Assistant Examiner

U.S. Cl. X.R.

117—161